United States Patent

Roark et al.

[11] 4,174,729
[45] Nov. 20, 1979

[54] PRESSURE SENSING SAFETY DEVICE

[75] Inventors: James T. Roark, Carrollton; Oliver W. McCracken, Richardson, both of Tex.

[73] Assignee: Otis Engineering Corporation, Dallas, Tex.

[21] Appl. No.: 772,007

[22] Filed: Feb. 25, 1977

[51] Int. Cl.² ............................................. G05D 16/20
[52] U.S. Cl. .................................. 137/487.5; 137/557
[58] Field of Search .................. 137/487.5, 458, 557; 116/112, 117 R; 73/391

[56] References Cited

U.S. PATENT DOCUMENTS

| | | | |
|---|---|---|---|
| 3,726,307 | 4/1973 | Carman | 137/487.5 |
| 3,878,803 | 4/1974 | Snyder | 137/458 |

*Primary Examiner*—Alan Cohan
*Attorney, Agent, or Firm*—Warren H. Kintzinger

[57] ABSTRACT

A safety device for sensing and monitoring pressure in oil or gas wellheads, flow lines, manifolds, pipelines, and the like, as well as other pressure vessels or apparatus requiring pressure sensing and monitoring, includes a pilot device having a transducer in operative communication with the source of pressure to be sensed or monitored; the transducer producing an electrical signal proportional to the magnitude of the pressure sensed. The pilot device further includes an electronic circuit which is adjustable to provide predetermined upper and lower values representing a range of magnitudes of pressure. The electronic circuit includes a memory circuit which permits the pilot device to indicate that an out-of-range pressure has been or is being sensed. The safety device also includes a means for visibly indicating the present value of pressure being sensed as well as out-of-range pressure conditions that may have occurred previously. The electronic circuitry produces a signal representing the condition of the pressure being sensed, which signal may be directed to the wellhead or other pressure vessel safety system to permit appropriate remedial action to be taken if necessary.

6 Claims, 4 Drawing Figures

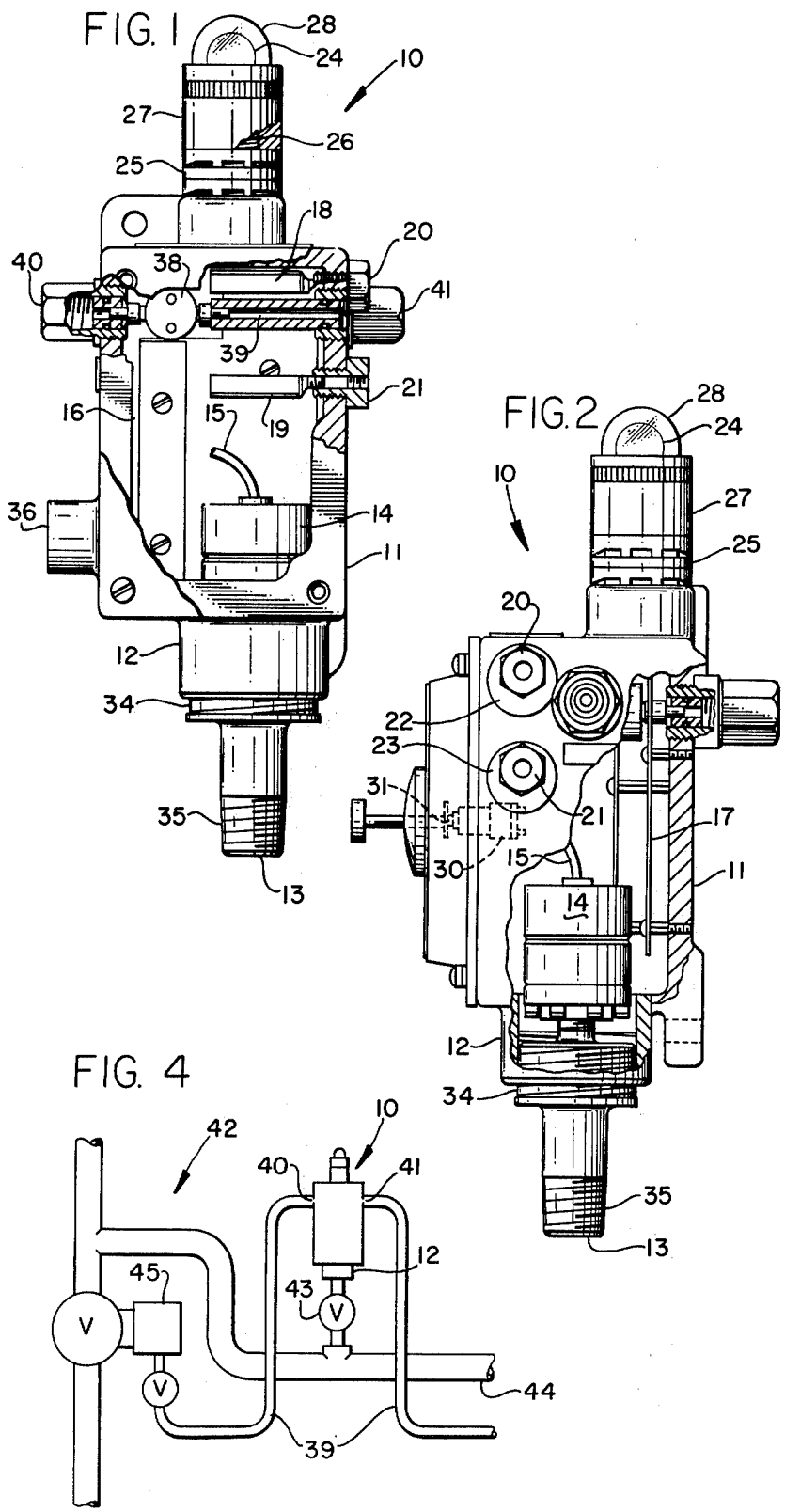

PRESSURE SENSING SAFETY DEVICE

This invention relates in general to safety systems, and more particularly to safety systems for use in monitoring pressure in oil and natural gas wellheads, lines, and the like, as well as other types of pressure vessels, and to systems wherein in response to an indication that the pressure in the vessel being monitored is out of range, that it is over or under certain predetermined pressure limits, a safety device such as a safety valve is actuated to correct the condition.

In the past pressure sensing safety devices such as pilots have employed various mechanical means to sense and monitor pressure in pressure vessels. The use of such mechanical means has involved problems with accuracy and dependability, particularly as the device ages. Most mechanical pressure sensing devices involve the use of resilient springs and seals which change their calibration with age or experience leakage problems. Frequently such springs and seals weaken or stick and experience increased friction creating further accuracy and reliability problems. In addition, certain pressure sensing devices having the capability of having their pressure range adjustable, have required that the source of pressure such as a wellhead or flow line be shut down in order to permit adjusting or changing of the desired pressure limits. Further, certain sensing devices, while capable of indicating an out-of-range pressure condition, have not had the capability of indicating both the fact that an out-of-range condition had previously occurred when subsequently the pressure returns to an in-range condition. Such devices have either been limited to showing that an earlier out-of-range condition had occurred or that one currently exists. They have not been able to show both that an out-of-range condition and the type of condition, i.e., below limits or above limits, occurred earlier together with the capability of showing what the current pressure condition is.

In accordance with an important aspect of this invention, a pressure sensing safety device in the form of a pilot device employs a transducer which senses the pressure in a pressure vessel such as an oilfield or natural gas wellhead or flow line, or the like, to which it is connected, and produces an electrical signal which is proportional or analogous to the pressure contained in the pressure vessel or other source of pressure. The safety pilot further includes an electronic logic circuit which determines whether the pressure sensed by the transducer is above or below or within the predetermined upper limit and the predetermined lower limit of pressure. The circuit includes potentiometers which may be set to provide the predetermined upper and lower limits. Comparator circuits compare the signal received from the transducer with the signals representing the upper limit and lower limit to determine whether the pressure being sensed is out of range on the high side or out of range on the low side, or within the range preselected.

The electronic circuit further contains a memory circuit permitting the pilot to indicate that an out-of-range condition has existed while simultaneously permitting the safety pilot to indicate what the current condition is even though it may have changed to a within-range or out-of-range condition. The pilot further contains a circuit for operating an indicator light permitting it to provide a visual indication of the current or past condition of pressure. Various conditions are indicated by varying the rate at which the light blinks, thereby providing visual indication of one of several possible combinations of past and present conditions. Further, the pilot includes a circuit producing a signal which is connected to a solenoid controlling a control line connected to a safety valve which under appropriate circumstances can shut down or modify the pressure in the flow line or other pressure source being sensed. The control circuit and solenoid are designed to "fail-safe", that is, in the event of pilot device failure, the solenoid operates to close the safety valve controlling the pressure source.

Accordingly, it is an object of the present invention to provide an improved safety device for sensing and monitoring pressure in a pressure vessel or other source of pressure.

It is a further object of this invention to provide a safety device for sensing pressure which is highly accurate and reliable and which avoids inaccuracy and unreliability caused by aging of the device.

It is a further object of this invention to provide a pressure sensing safety device which is fail-safe.

It is a further object of this invention to provide a pressure sensing safety device which contains adjustable means for setting the safety device so that it monitors pressure within and without a predetermined pressure range.

It is a further object of this invention to provide a pressure sensing safety device which can be adjusted with respect to its upper and lower limits of pressure sensing range without disconnection from the source of pressure being sensed.

Specific embodiments representing what is presently regarded as the best mode of carrying out the invention are illustrated in the accompanying drawings.

FIG. 1 represents a plan view of a safety device according to this invention with portions thereof broken away and portions shown in section.

FIG. 2 is a side view of the safety device of FIG. 1 with portions that are cut away and portions shown in section.

FIG. 4 is a view showing the safety device in accordance with this invention connected in an installation with a source of pressure to be monitored and controlled.

Figure 3:
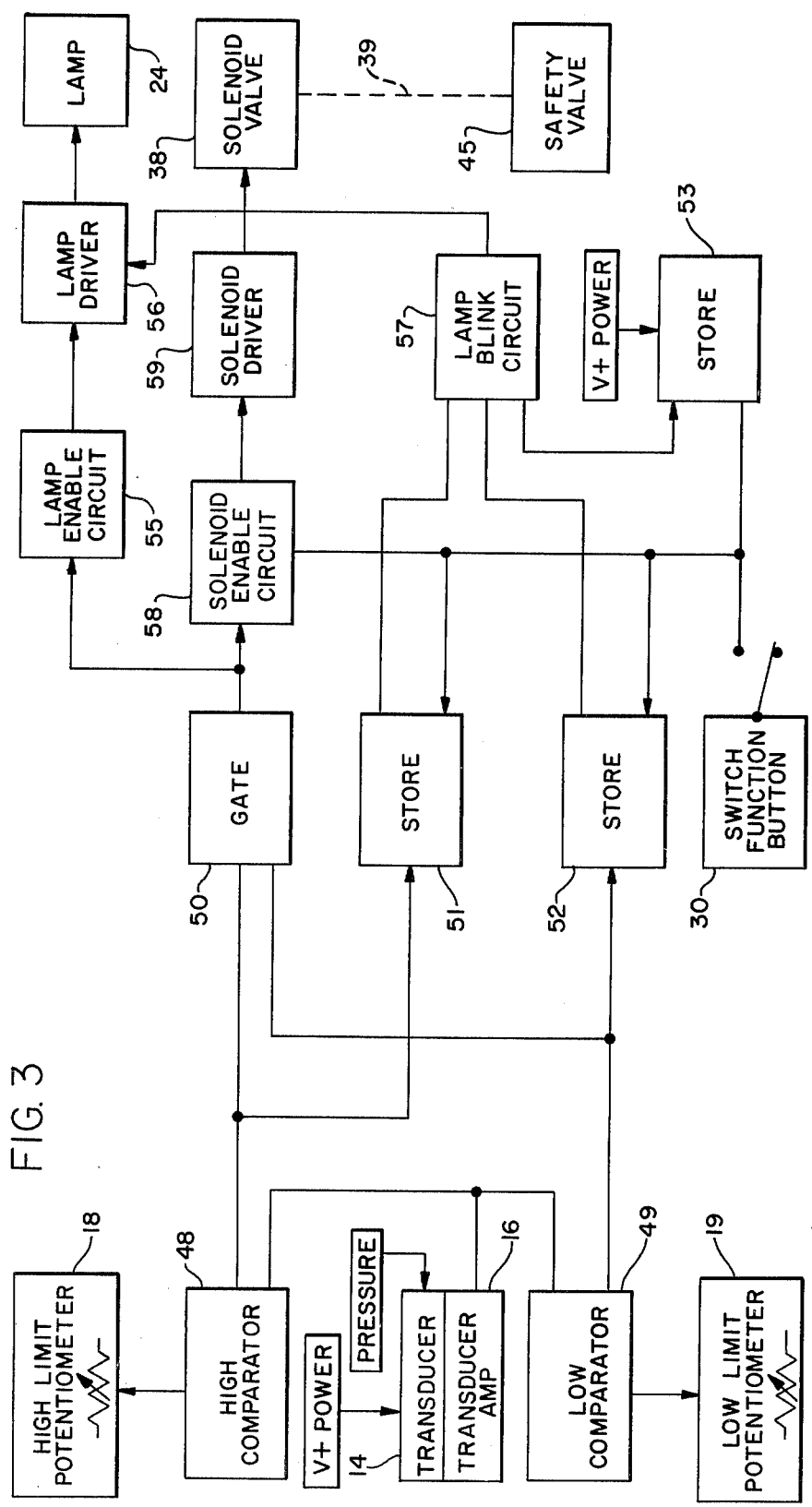
FIG. 3 is a block diagram of a circuit employed in the present invention.

Referring now to the drawings, particularly FIGS. 1 and 2, there is shown generally at 10 a pilot device in accordance with this invention. The pilot includes a housing 11 having a stand 12 including therein an orifice 13 and having male bushings 34 and 35, respectively, for mounting the pilot 10 in hermetic interconnection with a source of pressure to be sensed in a pressure vessel. The orifice 13 also communicates with a transducer 14 mounted within the housing 11 such that it operatively communicates with the pressure received through orifice 13. Shown generally at 36 is an opening in housing 11 to permit electrical connection of the transducer 14, a circuit mounted on printed circuit board 17 and associated electrical elements, with a source of electrical power. The transducer 14 includes an electrical connection 15 with a transducer amplifier 16 mounted within the housing 11. As will be described more fully in connection with FIG. 3, the output of transducer amplifier 16 is electrically connected into the circuit mounted on printed circuit board 17, which is mounted within housing 11. Also mounted within housing 11 is a high limit potentiometer 18 and a low limit potentiometer 19. Adjustable potentiometers 18 and 19 are connected through the wall of housing 11 to adjustable set screws 20 and 21, respectively, mounted on the exterior of housing 11 to permit access for easy adjustment of the potentiometers to represent the appropriate upper and lower limits of pressure desired in the operation of the pressure vessel (not shown). Surrounding set screw 20 is a faceplate 22 containing upper limit calibration marks to permit adjustment of the upper limit potentiometer 18 to the desired value. Similarly, a faceplate 23 containing lower limit calibration marks surrounds set screw 21 to permit adjustment of the low limit potentiometer 19 to the desired value. On the upper portion of housing 11 is a light 24 mounted in a socket 25 mounted on housing 11. The mounting 25 includes a bushing 26 for receiving a screw-on cap 27 on which is mounted a lens 28. Also mounted within housing 11 is manually operable function switch 30 having a movable button portion 31. The switch 30 is interconnected electrically with the circuit contained on printed circuit board 17. The function of switch 30 will be more fully described in connection with the circuit shown in FIG. 3.

Also mounted within housing 11 is a solenoid 38 in electrical connection with printed circuit board 17. As will be described more fully in connection with FIG. 3, solenoid valve 38 is used to operate, in response to appropriate signals from the circuit contained on printed circuit board 17, to open or close the low pressure control line 39 which communicates through solenoid 38 and through the housing 11 through parts or ofifices 40 and 41. As will be later described in connection with FIG. 4, the low pressure line 39 is used to control an appropriate safety valve 45 mounted within the flow line or other pressure vessel whose pressure is being monitored.

Referring now to FIG. 4, the pilot 10 is shown mounted in a typical flow line installation generally designated at 42. The pilot 10 is mounted through stand 12 on control valve 43 in communication with flow line 44. When the pressure in flow line 44 increases or decreases beyond the predetermined limits as set through potentiometer set screws 20 and 21, the solenoid valve is actuated to connect or disconnect the pressure in line 39, which is connected to operate a safety valve 45, which controls the flow through main flow line 44, as will be later described in connection with FIG. 3.

Referring now to FIG. 3, there is shown a block diagram of the electrical and electronic elements contained within pilot 10. The transducer 14, in response to pressure sensed by it from a pressure vessel such as flow line 44, produces a voltage analogue of the applied pressure, which is amplified through the transducer amplifier 16. High limit potentiometer 18 and low limit potentiometer 19, having been preset with high and low limits through set screws 20 and 21, respectively, present analogue voltages corresponding to the desired values of high pressure and low pressure limits desired in operation of flow line 44, to the high limit comparator circuit 48 and the low limit comparator circuit 49, respectively. Comparator 48 compares the voltage received from transducer amplifier 16 with the voltage level from high level potentiometer 18 and determines whether the output voltage from amplifier 16 is above and below the voltage level from high limit potentiometer 18. Similarly, low limit comparator 49 compares the voltage level received from transducer amplifier 16 with the voltage level received from low limit potentiometer 19 to determine whether the voltage received from transducer amplifier 16 is above or below the low limit voltage received from potentiometer 19. Logic signals indicating out of range on the high side or out of range on the low side or within range are generated and passed through gate 50 to memory circuits 51, 52 and 53.

Additionally, logic signals are generated which actuate lamp enable circuit 55 and lamp driver circuit 56 to activate lamp 24. Lamp driver circuit 56 is controlled by a lamp blink circuit 57, which operates to control the blink rate of lamp 24 based upon the appropriate signal received from memory circuits 51, 52 and 53, as will be explained more fully. Further signals are generated and passed through solenoid enable circuit 58 and solenoid driver 59 to operate solenoid valve 38, which, as discussed previously, controls a low level pressure control line 39, which operates safety valve 45 installed in flow line 44, as shown in FIG. 4. Manually operable function switch 30 operates to override the signals fed to the lamp enable circuit 55 and the solenoid enable circuit 58 in order to permit logic signals stored in memory circuits 51, 52 and 53 to control the operation of the solenoid and lamp enable circuit in a manner to be discussed.

Based on the signals output from the comparator circuits 48 and 49 and passed through the gate 50, logic storage memory circuits 51, 52 and 53 are activated to retain the reason for an out-of-service condition. These reasons can be (a) that the output from the transducer amplifier 16, which is an analogue of the applied pressure, is or has been higher than the voltage from the high limit reference potentiometer, (b) that the transducer amplifier output voltage is or has been lower than the voltage from the low voltage reference potentiometer 49, or (c) that the unit has been manually removed from service by activation of the function switch 30 or power to the unit has been interrupted.

When the transducer 14 senses a pressure which is within the pressure range desired for flow line 44 and calibrated on potentiometers 18 and 19, a signal is fed to lamp 24 which permits a steady glow from the lamp indicating that the pressure in the flow line 44 is within the desired range. In the embodiment shown and described herein, when the output of the transducer amplifier 16 indicates that a pressure is or has been sensed which is out-of-range, that is higher than the high limit set on potentiometer 18, the lamp blink circuit 57 activates the lamp driver circuit 56 such that the lamp 24 blinks at a rate of two blinks per second. When the output from the transducer amplifier 16 indicates a pressure out of range on the low side, that is lower than the low limit preset on potentiometer 19, the blink circuit 57 operates lamp driver circuit 56 to provide a blink rate for lamp 24 of once every two seconds. When the unit 10 has been manually removed from service by operation of the function switch 30, or when a power loss has been experienced, the signal to the lamp 24 is cut off and no glow is seen, thereby visually indicating these conditions. It will be understood that alternate means of display can be employed such as a meter, or the like.

When the pilot device 10 is activated and the voltage from the transducer 19 is such that it lies between the high and low limits, that is, within range, the solenoid valve 38 is maintained in the energized state, causing safety valve 45 to remain open and flow line 44 to remain in operation. In the event of a power loss or an out-of-range condition, that is, when the pressure sensed by transducer 17 is above or below the predetermined desired valves of pressure in flow line 44, the solenoid valve is de-energized to close safety valve 45, thereby shutting off the flow of pressure through flow line 44. Thus the system is designed to operate in a fail-safe manner.

Whereas this invention is herein illustrated and described with respect to various embodiments thereof, it should be realized that various changes may be made without departing from the essential contributions to the art made by the teachings hereof.

We claim:

1. A safety device for monitoring and controlling the pressure in a pressure vessel comprising, in combination, a pilot device in operative engagement with the pressure vessel, a transducer mounted on the pilot device and communicating with the pressure vessel to sense the magnitude of the pressure within the pressure vessel, a source of power for the transducer, an amplifier electrically connected with the transducer to amplify electrical signals received therefrom, a first potentiometer adjustable to provide a first reference voltage corresponding to an upper limit of pressure desired in the pressure vessel, a second potentiometer adjustable to provide a second reference voltage corresponding to a lower limit of pressure desired in the pressure vessel, a first comparator circuit electrically connected with the first potentiometer and the transducer amplifier to compare the signals received therefrom and to provide a signal representing the magnitude of the pressure in the pressure vessel, a second comparator circuit electrically connected with the second potentiometer and the transducer to compare the signals received therefrom and to provide a signal representing the magnitude of the pressure in the pressure vessel, a gate receiving the output signal from the comparator circuits, a memory circuit for storing the signals received from the comparator circuits through the gate, a visual indicator electrically connected to the gate to receive the output of the comparator circuits for providing a visual display of the magnitude of the pressure in the pressure vessel; and including a circuit for controlling the operation of the visual display, the circuit being electrically connected to the memory circuit and the gate, a manually operable switch electrically connected to the memory circuit and the control circuit whereby operation of the manual switch in a first mode permits the visual display to indicate the present magnitude of pressure in the pressure vessel and operation of the switch in a second mode permits the visual display to indicate a prior magnitude of pressure in the pressure vessel when the signals stored in the memory circuit correspond to the magnitude of pressure above or below the predetermined desired levels or pressure in the pressure vessel.

2. The safety device of claim 1 and including means controlling the magnitude of the pressure in the pressure vessel, actuating means electrically connected to the output of the gate and operatively engaged with the control means to modify the pressure in the pressure vessel when the pressure sensed by the transducer is above or below the predetermined upper and lower limits of pressure desired in the pressure vessel.

3. The safety device of claim 2 wherein the control means is a valve controlling operation of the pressure vessel and the actuating means is a solenoid.

4. The safety device of claim 3 wherein the solenoid is in the energized state and operates the valve to an open position permitting operation of the pressure vessel when the pressure in the pressure vessel as sensed by the transducer is within the desired upper and lower pressure limits and in the deenergized state operating the valve to a closed position stopping operation of the pressure vessel when the pressure is outside the upper and lower limits.

5. The safety device of claim 1, wherein the indicator control circuit, when the manually operable switch is in the second mode, operates the indicator to provide a first visual indication when the pressure sensed in the pressure vessel is or has been below the predetermined lower limit and a second visual indication when the pressure sensed in the pressure vessel is or has been above the predetermined upper limit.

6. The safety device of claim 5 wherein the visual indicator is a lamp and wherein the first visual indication is a first rate of blink of the lamp and the second visual indication is a second rate of blink of the lamp.

* * * * *